United States Patent
Hakamata

(10) Patent No.: US 6,700,276 B2
(45) Date of Patent: Mar. 2, 2004

(54) STATOR FOR ROTATY ELECTRICAL EQUIPMENT

(75) Inventor: Ken Hakamata, Shuuchi-gun (JP)

(73) Assignee: Kabushiki Kaisha Moric, Shuuchi-gun (JP)

(*) Notice: Subject to any disclaimer, the term of this patent is extended or adjusted under 35 U.S.C. 154(b) by 60 days.

(21) Appl. No.: 10/063,175

(22) Filed: Mar. 27, 2002

(65) Prior Publication Data

US 2002/0145354 A1 Oct. 10, 2002

(30) Foreign Application Priority Data

Apr. 9, 2001 (JP) ........................... 2001-110207

(51) Int. Cl.⁷ ............................................. H02K 1/00
(52) U.S. Cl. ................... 310/179; 310/71; 310/180; 310/260; 310/216; 310/179
(58) Field of Search ................. 310/71, 216, 179

(56) References Cited

U.S. PATENT DOCUMENTS 5,194,775 A * 3/1993 Cooper ................... 310/260
5,661,355 A * 8/1997 Darceot ................... 310/180

* cited by examiner

Primary Examiner—Thomas M. Dougherty
Assistant Examiner—Iraj A. Mohandesi
(74) Attorney, Agent, or Firm—Ernest A Beutler

(57) ABSTRACT

A rotating electrical machine having cooperating rotor and stator, one of which forms a plurality of pole teeth around which individual coils are wound. The coils are connected in a number depending upon the phase and number of poles and the connected coils of each phase are spaced from each other. Crossover wires connect these coil windings of each phase and the crossover wires are affixed by bonding to outstanding tabs that are formed on the outermost laminations of the assembly. This reduces hand labor and insures that the crossover wires will not interfere with other components of the machine or associated driving or driven structures.

15 Claims, 7 Drawing Sheets r: right
l: left

# STATOR FOR ROTATY ELECTRICAL EQUIPMENT

BACKGROUND OF INVENTION

This invention relates to an improved stator for rotary electrical equipment and more particularly to an improved coil winding arrangement for multi-phase equipment of this type.

In connection with rotating electrical machines, it is common practice to employ a series of circumferential spaced permanent magnets which cooperate with pole teeth around which coil windings are formed in order to either produce electrical power when the machine is a generator or to provide a driving force when the machine is a motor. The coil windings are wound around the pole teeth. When multi-phase winding is employed, certain coils are placed on adjacent pole teeth and then a number of coils is skipped for each phase before the next series of coils is wound for the phase. A wire called a "crossover wire" connects the groups of coil windings of each phase.

A disadvantage with this type of construction is that the crossover wires must be dealt with. That is, they must be positioned in such a way so that the crossover wires are not accidentally placed in a position where they may be damaged. This requires hand placement of the crossover wires and greatly impedes the ability to expedite production. It is therefore the practice to provide some form of clamping arrangement that fixes these crossover wires to the stator core or to the housing of the machine, thus requiring manual labor.

Also, there is a problem in connection with the tying down or holding of these crossover wires so they do not become displaced when the machine is on operation. This also necessitates the tying down of the crossover wires.

It is, therefore, a principal object to this invention to provide an improved rotating electrical machine having phase windings and wherein the crossover wires connecting the coils of the individual phases are rigidly held in position and without manual operation.

It a further object to this invention to provide an improved coil winding arrangement for a multi-phase rotating electrical machine.

SUMMARY OF INVENTION

This invention is adapted to be embodied in a coil winding arrangement for a rotating electrical machine. The winding arrangement is comprised of a core comprised of a plurality of laminated plates each having a cylindrical portion from which a plurality of circumferentially spaced, pole tooth forming portions extend in a generally radial direction. The plurality of laminated plates are held in abutting relation with their pole tooth forming portions aligned to form a plurality of cores. A plurality of phase windings are wound on the core. Each of these phase windings are wound around a series of the cores arranged in groups of adjacent cores. The groups of cores are spaced by cores around which other of the phase windings are wound. The windings of each group of each of the phases are connected to each other by crossover wires to provide the electrical connection between the coils of the groups of adjacent cores. An axial outermost of the laminated plates is formed with outstanding tabs at circumferentially spaced locations against which said crossover wires lie.

In accordance with another feature of the invention, the crossover wires are adhesively bonded to the tabs by an insulating material.

DETAILED DESCRIPTION

Figure 1:
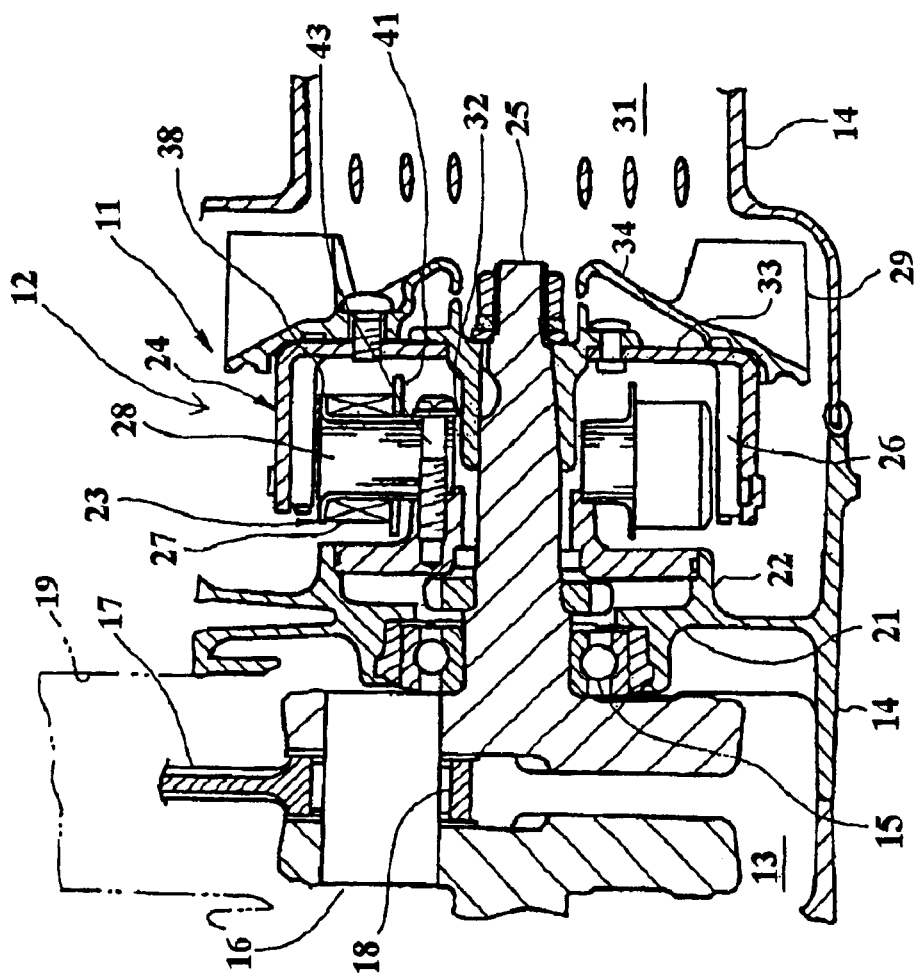
FIG. 1 is a cross sectional view taken through a portion of an internal combustion engine associated with a rotating electrical machine constructed in accordance with an embodiment of the invention.

Referring now in detail to the drawings and initially primarily to FIG. 1, an embodiment of the invention is shown as associated with an internal combustion engine, indicated generally by the reference numeral 11. The invention is shown in conjunction with an internal combustion engine 11 because this is a typical environment in which the invention can be utilized although the use is not so limited.

One reason why this invention has particular utility with internal combustion engines is that it permits a compact rotating electrical machine and one, which can be machined and produced in high production volumes at a low cost because the amount of manual labor involved is substantially minimized.

Only a portion of the engine 11 is shown and where any details of the engine are not illustrated or described, those skilled in the art will readily understand how the invention can be applied in this type of environment.

In this embodiment, a rotating electrical machine, indicated generally by the reference numeral 12 is provided in an area forwardly of the engine crankcase, indicated by the reference numeral 13, and is closed by a front cover 14 that is fixed to a front wall of a crankcase 13. The crankcase 13 provides an anti-friction bearing 15 for journaling a crankshaft 16 of the engine 11. The crankshaft 16 is of the split type and is provided with one or more throws on which the big ends of connecting rods 17 are journalled by roller or needle type bearings 18. The connecting rods 17 are connected at their upper ends to pistons, which reciprocate in cylinder bores 19 of the engine.

A front wall 21 of the crankcase 13 has a nose portion 22 that forms the carrier for the stator, indicated generally by the reference numeral 23, of the rotating electrical machine 12. In this specific embodiment, the rotating electrical machine 12 is a generator but it should be understood by those skilled in the art that it also could be a motor for starting the engine 11.

A rotor assembly 24 of the rotating electrical machine 12 has a keyed connection to a nose portion 25 of the crankshaft 16. This rotor is of an inverted cup shape and carries a number of circumferentially spaced permanent magnets 26 opposite of alternating polarity around its circumference. These magnets 26 cooperate with coil windings 27 formed on pole cores or teeth 28 of the stator 23.

A cooling fan 29 draws cooling air through an inlet opening 31 for cooling the generator 12.

Figure 2:
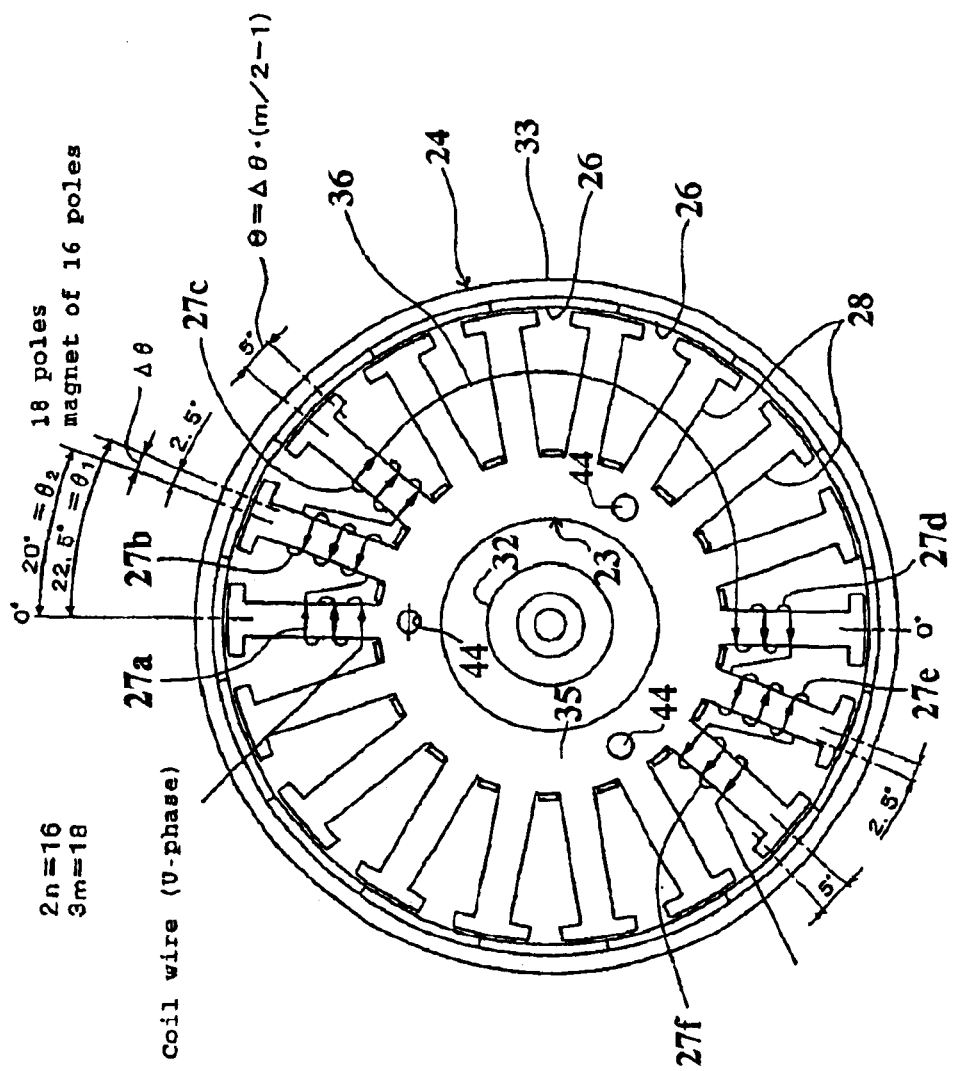
FIG. 2 is an end elevational view of the rotating machine and showing the coil winding arrangement for a single phase.
Figure 3:
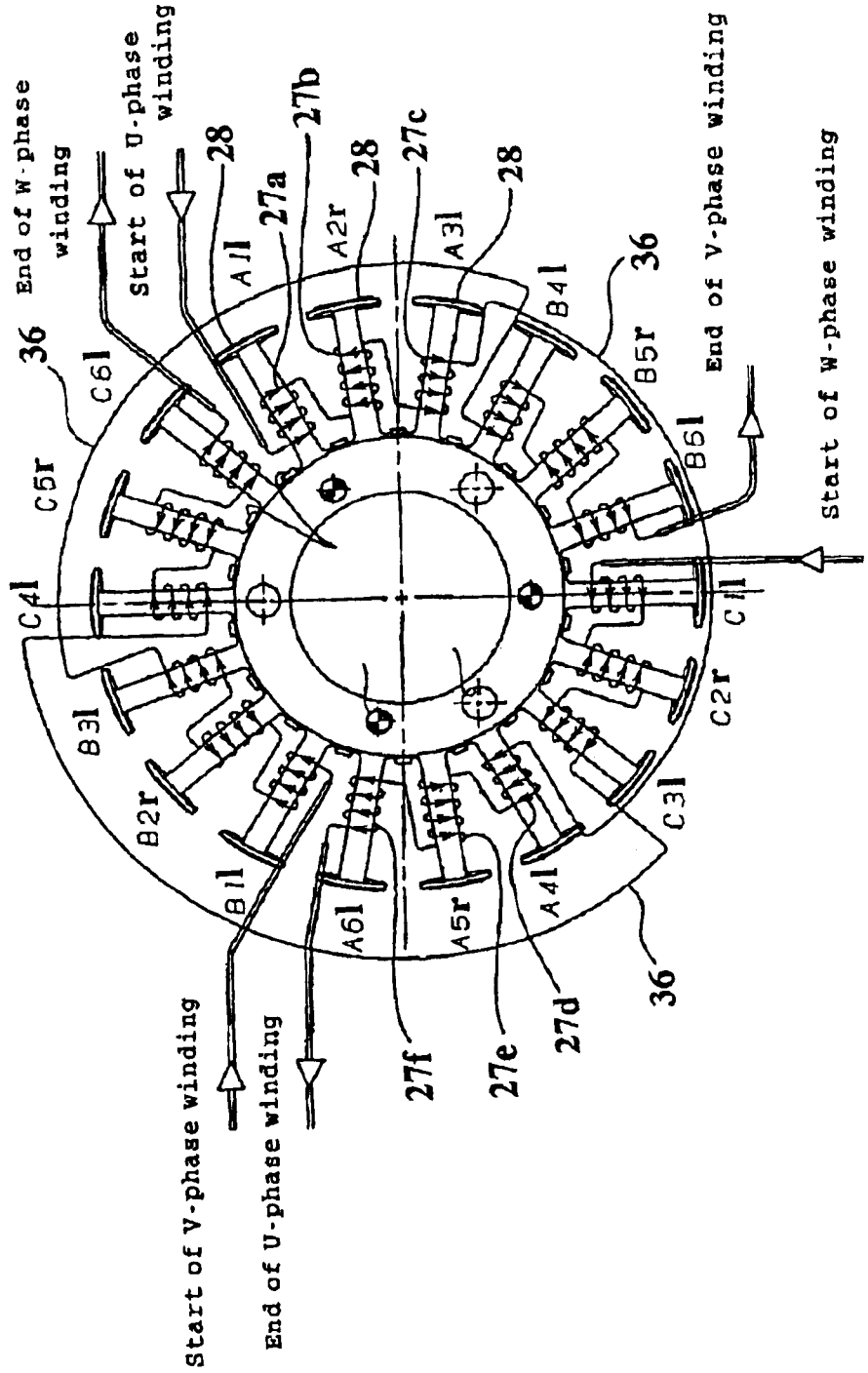
FIG. 3 is a view looking in the same direction as FIG. 2 but shows all of the phases of the winding.

Referring now additionally to FIGS. 2 and 3, as noted the rotor 24 is fixed for rotation with the crankshaft 16. To this end the rotor 24 has a boss portion, which comprises a boss section 32 fixed to a crankshaft 16 of the engine 11. The permanent magnets 26 are fixed to a cup shaped member 33 fixed to a flange of the boss section 32 by rivet fasteners 34.

Figure 5:
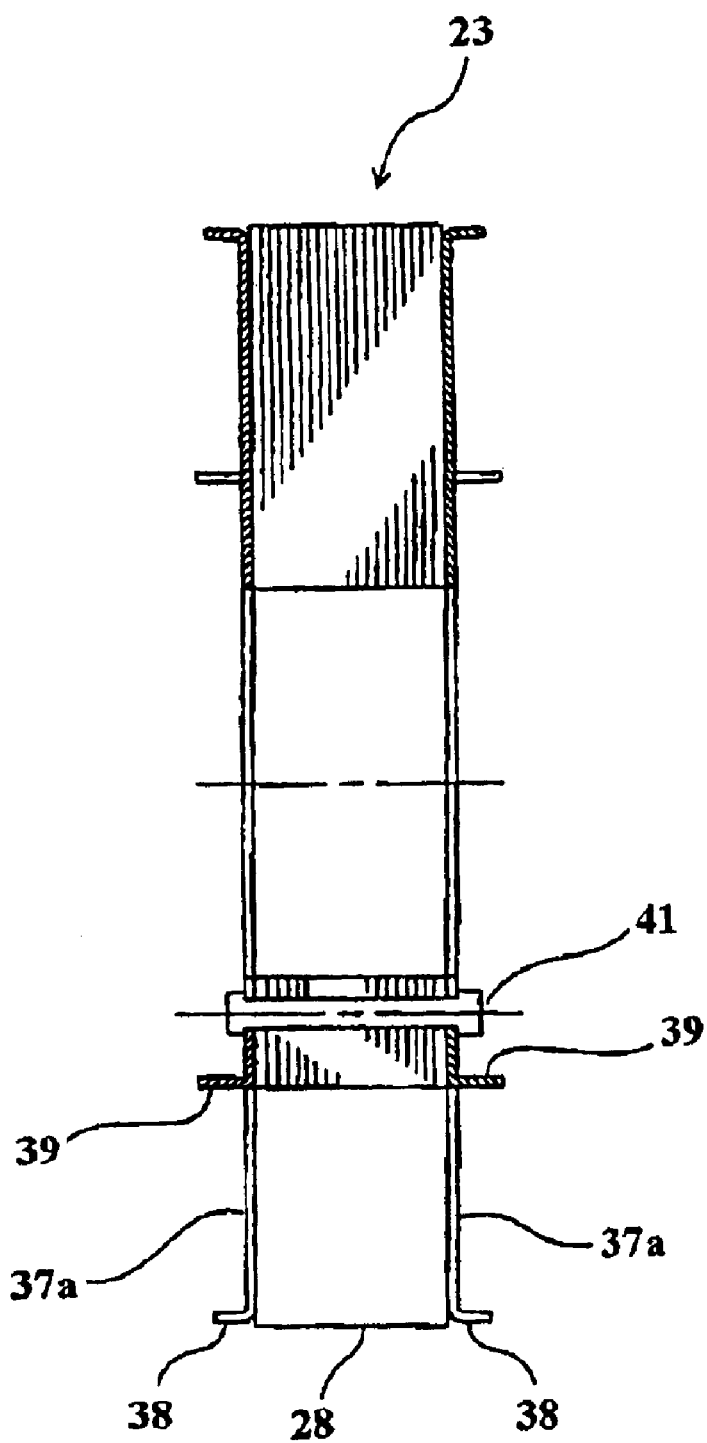
FIG. 5 is a cross sectional view taken along the line 5—5 of FIG. 4 but with the windings eliminated.

The permanent magnets 26 are magnetized such that they have 2n polarities alternating in the circumferential direction. In this example n=8, and the number M of magnetic poles is 2n=16. Regarding the number of magnetic poles arranged in the direction of rotation of the rotor, since North (N) poles and South (S) poles of the same number are disposed at regular intervals in the circumferential direction, the number of magnetic poles is 2n. The number P of teeth or cores (magnetic pole teeth) 28 of the stator core is 3m for a three-phase generator, where n, m are positive The stator 23 is made of laminated thin steel plates as will be described in more detail later by reference to FIGS. 5 and 6. The stator and its individual plates are comprised of continuous cylindrical portions 35 from which the pole cores or teeth 28 extend outwardly in a radial direction and on which the coils 27 are wound. The stator 23 has eighteen teeth 28, and thus 3×m=18, which gives m=6.

The coils 27 have U-, V- and W-phases. The coils 27(U), 27(V), 27(W) of each phase are wound on adjacent three teeth in series as seen in FIGS. 2 and 3. Coils 27a, 27b, 27c on adjacent three teeth are connected by a crossover wire 36 to coils 27d, 27e, 27f on adjacent three teeth at a symmetrical position six teeth ahead. Of course the coils 27 and their crossover wires 36 are preferably formed from a continuous strand of wire although they are referred to separately.

The winding direction of each coil 27a–27f is made so that induced voltage of each coil 27a–27f has the same polarity corresponding to polarity change of the permanent magnets 26 to which each coil 27a–27f faces.

In this embodiment, the number of teeth or cores 28 of the stator 23 is 3m, that of magnetic poles of the rotor 24 is 2n, and the numbers 3m, 2n are set such that 2/n is not to be an integer so that induced voltages of a plurality of teeth forming a voltage of the same phase have the same polarity and different phases. As a result, driving torque is decreased, enabling size reduction of the driving engine, and a smooth output waveform is effected, improving efficiency of power generation, as is disclosed in Laid Open Japanese Patent Application Hei 11-288449 filed by the present applicant (corresponding U.S. Ser. No. 09/628,755, filed Jul. 31, 2001), and the description thereof will be repeated here.

In this embodiment, neodymium-iron-boron permanent magnets 26 are used, having 2n=sixteen poles, and the number of teeth 28 is eighteen, that is, 3m=18. Therefore, n=8 and m=6. In this case, an angle (pitch) θ 1 between the magnets 26 is θ 1=2π/2n (radian)=22.5°, and an angle (pitch angle) θ 2 of the teeth 28 is θ 2=2 π/3n (radian)=20°.

Since the number of teeth 28 is a multiple of two, the coils 27 of the same phase (U-phase in FIG. 2) are divided into two groups, that is, symmetrical groups 27a–27c and 27d–27f of m/2=three poles each, and each coil group is wound on adjacent three teeth 28 in series. Since the adjacent teeth 28 face to magnets 26 of different polarities, the coils are wound on the teeth alternately in the opposite directions so that induced voltages of the coils are not reversed to each other. In this embodiment, an angle by which 2/m=three teeth 28 are offset from three magnets 26, or a phase difference Θ, is Δθ×(m/2−1)=Δθ×2, and thus Θ=Δθ×2<θ½.

As has been previously noted, the core of the stator 23 is made up of laminated steel plates. That construction will now be described by principle reference to FIGS. 5 and 6. The laminated thin steel plates of the stator 23 are indicated generally by the reference numeral 37. Each plate 37 has a continuous cylindrical section 35 from which the poles or teeth 28 radiate. These plates 37 comprise inner thin plates 37b sandwiched by axial outermost upper and lower two plates 37a. Except as hereinafter noted, the plates 37b and 37a are of the same shape. The tip ends of the teeth 28 are stamped out in the shape of a letter T.

Figure 4:
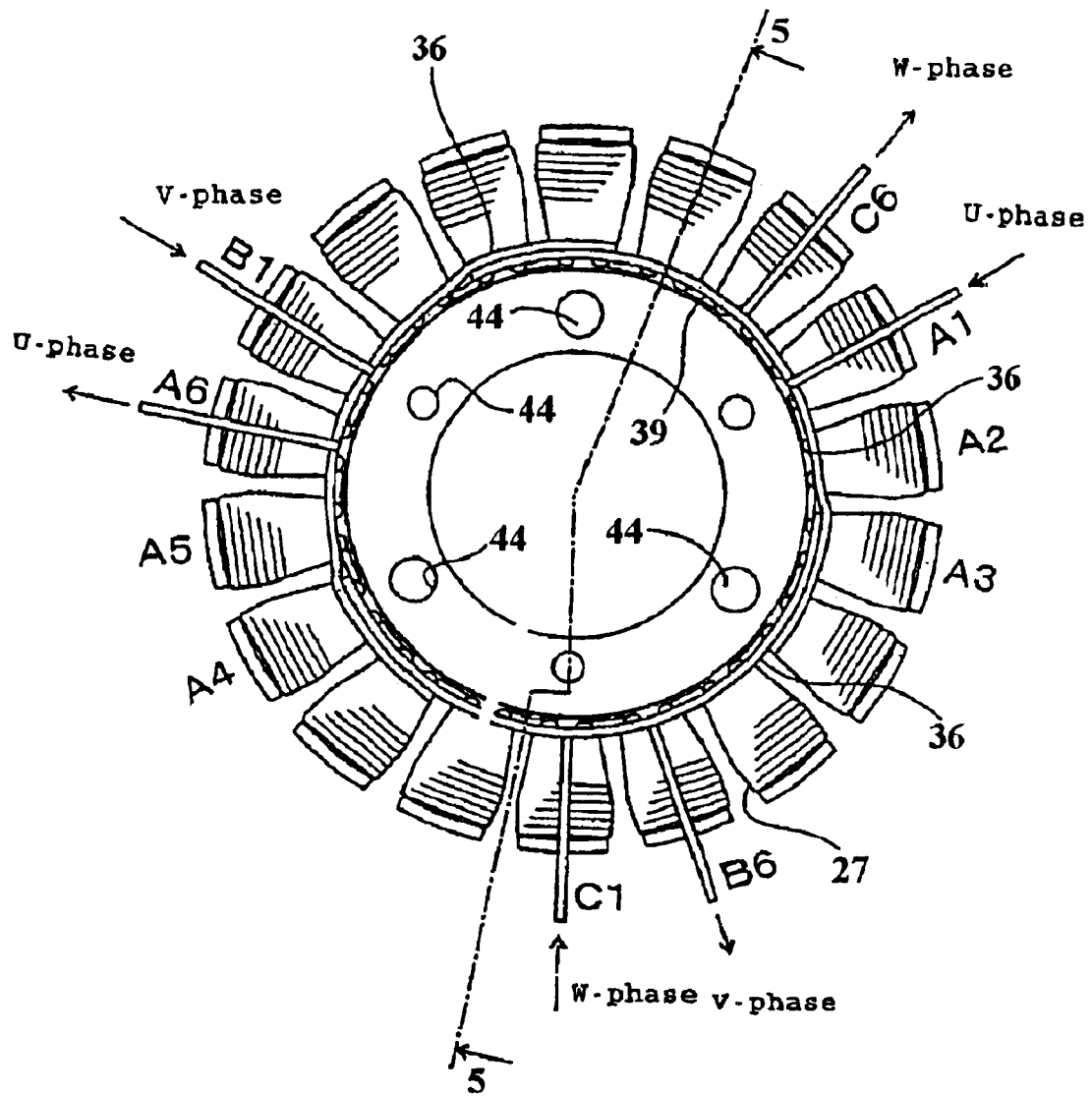
FIG. 4 is a view, in part similar to FIGS. 2 and 3, but shows the finished coil winding arrangement.
Figure 6:
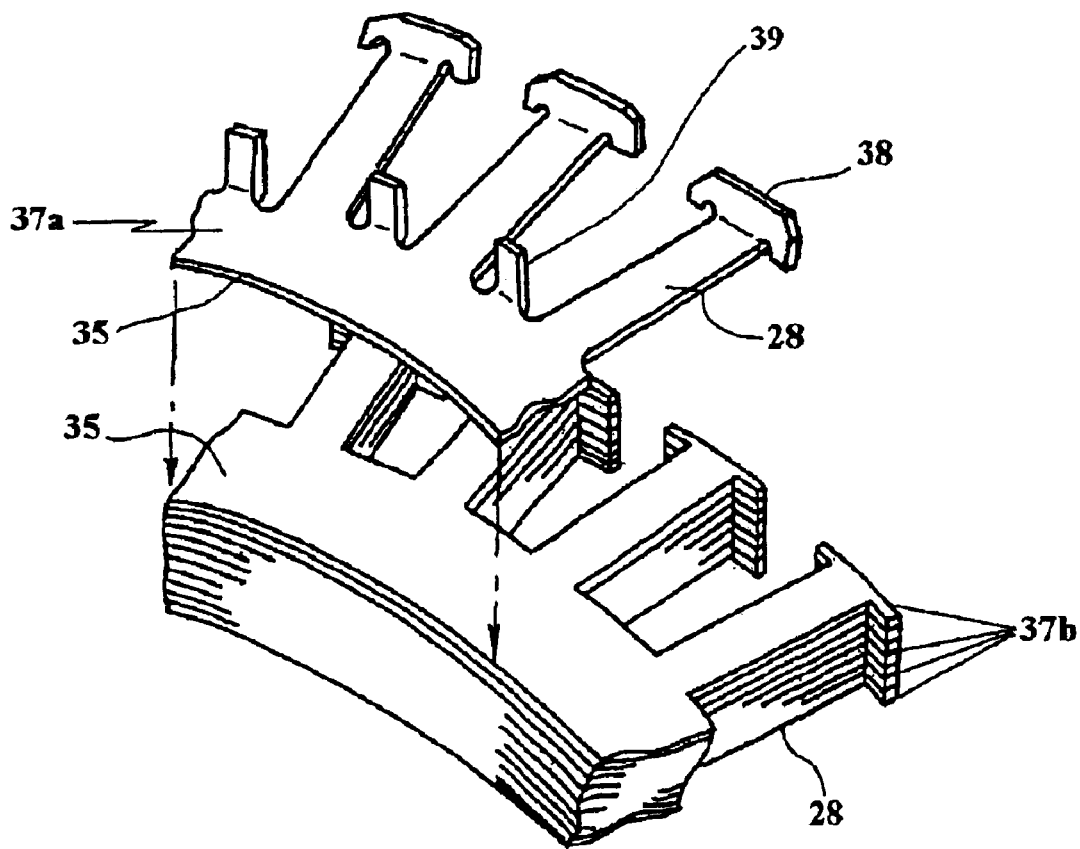
FIG. 6 is a partially exploded perspective view showing the armature core.

The outermost two thin plates 37a have tabs 38 bent at their tip ends at right angles (in the direction of lamination), as shown in FIG. 6, so that the tabs 38 overlie the T-shaped tip portions of the tip ends of the teeth 28 of the middle plates 37b. Near the bottoms of slots between the teeth 28 of the outer plates 37a are formed further tabs 39 extending axially outwardly in the direction of lamination. The thin plates 37a, 37b are laminated and fastened together with their pole teeth 28 aligned by a plurality of rivets 41 (FIGS. 3, 4 and 6). In addition the attached assembly on the stator 23 is affixed to the crankcase nose portion 22 by a mounting plate 42 (FIG. 1) by fasteners 43 that pass through openings 44 in the stator 23.

After the plates 37a, 37b are laminated and fastened together with the rivets 41, this assembly is coated with insulating material, at least in the region including the teeth 28 and the tabs 39, that is, the area other than the cylindrical portion 35 of the stator 23.

The coil wire is wound around over the insulating material, as shown in FIG. 3. In this case, a crossover wire 36 (36(U), 36(V), 36(W)) of each phase is set on the outside circumferential side of the tabs 39 of the outermost thin plate 37a, as shown in FIG. 4. As a result, for the U-phase, circumferentially adjacent three coils shown by symbols A1, A2, A3 and three coils at a diagonal position shown by symbols A4, A5, A6 are formed. Likewise, for the V-phase, coils B1, B2, B3 and coils B4, B5, B6 at a diagonal position, and further for the W-phase, coils C1, C2, C3 and coils C4, C5, C6 at a diagonal position are formed. In this case, the crossover wire 36 (36(U), 36(V), 36(W)) of each phase is wired along the outside circumference of the tabs 39.

The stator 23 having coils 27 wound on all teeth 28 is then coated with insulating material. That is, coils wound on the teeth 28, and crossover wires 36 set outside the tabs 39, are coated with the insulating material and thus, the crossover wires 36 are adhesively bonded to the tabs 39 by the insulating material thus restricting their free movement. This final assembly is shown in FIG. 4.

Figure 7:
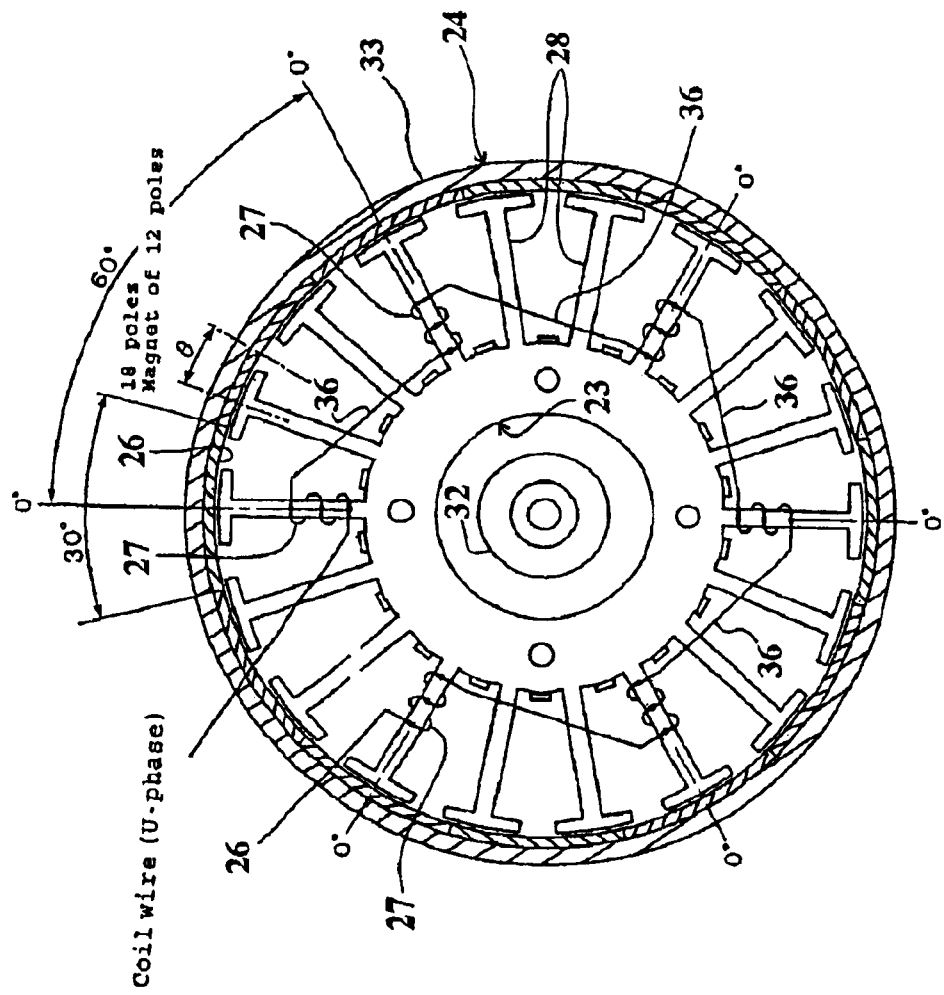
FIG. 7 is a view looking in the same direction as FIG. 2 and in part similar to this figure but showing another embodiment of the invention.

FIG. 7 is a front view of a rotating electrical machine constructed in accordance with another embodiment of the invention. This embodiment is made in the same manner as that of FIGS. 1–6 and differs only in the number of pole teeth and permanent magnets thus a complete description of the structure is not required.

In this embodiment the number M of magnetic poles of a rotor 24A is twelve and the number P of teeth of a stator 23A is eighteen. Coils 27A of each of U-, V- and W-phases are wound on every four teeth A in series. In this case, every four teeth 28 on which coils 27A of the same phase are wound, will face to magnetic poles 26 of the same polarity at the same electrical angle. Also, crossover wires 36A connecting every four coils of the same phase are set on the outside circumferential side of the tabs (not shown) provided on the outermost layer of the stator. As a result, the crossover wires 36A are prevented from being moved radially inwardly of the tabs. In addition, the coils 27A and crossover wires 36A are coated with insulating material for fixing, restricting free movement of the crossover wires 36A.

Thus, from the foregoing description it should be readily apparent that the described embodiments of the invention provide a very simple arrangement for a rotating electrical machine wherein manual labor is substantially reduced in assembly and wherein the crossover wires are automatically and permanently bonded so as to avoid their being positioned where they can obstruct the remainder of the machine or other components which may be associated with it. In addition, this provides a very neat assembly and insures long life without trouble. Of course, the embodiments described are only preferred embodiments of the invention and various changes and modifications may be made without departing from the spirit and scope of the invention, as defined by the appended claims.

What is claimed is:

1. A coil winding arrangement for a rotating electrical machine comprised of a core comprised of a plurality of laminated plates each having a cylindrical portion from which a plurality of circumferentially spaced, pole tooth forming portions extend in a generally radial direction, said plurality of laminated plates being in abutting relation with their pole tooth forming portions aligned to form a plurality of cores, a plurality of phase windings, each of said plurality of phase windings being wound around a series of said cores arranged in groups of adjacent cores, said groups of cores being spaced by cores around which other of said phase windings are wound, the windings of each group of each of said phases being connected to each other by crossover wires to provide the electrical connection between the coils of said groups of adjacent cores, an axial outermost of said laminated plates being formed with outstanding tabs at circumferentially spaced locations against which said crossover wires lie, and an adhesive bonding said crossover wires to said tabs.

2. A coil winding arrangement as set forth in claim 1, wherein the adhesive bond is being formed by an insulating material.

3. A coil winding arrangement as set forth in claim 2, wherein the insulating material is applied to the laminated plates before the winding and to the coils and crossover wires after winding.

4. A coil winding arrangement as set forth in claim 1, wherein the pole teeth extend radially outwardly from the cylindrical portion and the tabs are formed adjacent said pole teeth.

5. A coil winding arrangement as set forth in claim 4, wherein the tabs are formed in the gaps between the pole teeth.

6. A coil winding arrangement as set forth in claim 5, wherein the adhesive bond is formed by an insulating material.

7. A coil winding arrangement as set forth in claim 6, wherein the insulating material is applied to the laminated plates before the winding and to the coils and crossover wires after winding.

8. A coil winding arrangement for a three phase AC rotating electrical machine comprised of a core comprised of a plurality of laminated plates each having a cylindrical portion from which a plurality of circumferentially spaced, pole tooth forming portions extend in a generally radially direction, said plurality of laminated plates being in abutting relation with their pole tooth forming portions aligned to form a plurality of cores, a plurality of phase windings, each of said plurality of phase windings being wound around a series of cores arranged in groups of adjacent cores, said groups of cores being spaced by cores around which other of said phase windings are wound, the windings of each group of each of said phases being connected to each other by crossover wires to provide the electrical connection between the coils of said groups of adjacent cores, the number 3m of pole teeth being even, and coils of the same phase are wound on circumferentially adjacent m/2 pole teeth and m/2 pole teeth at a symmetrical position in series, and wound on the opposite direction to each other corresponding to polarity change of associated permanent magnets to which each pole tooth faces, and an axial outermost of said laminated plates being formed with outstanding tabs at circumferentially spaced locations against which said crossover wires lie.

9. A coil winding arrangement as set forth in claim 8, wherein the crossover wires are adhesively bonded to the outstanding tabs.

10. A coil winding arrangement as set forth in claim 9, wherein the adhesive bond is formed by an insulating material.

11. A coil winding arrangement as set forth in claim 10, wherein the insulating material is applied to the laminated plates before the winding and to the coils and crossover wires after winding.

12. A coil winding arrangement for a three-phase AC rotary machine comprised of a core comprised of a plurality of laminated plates each having a cylindrical portion from which a plurality of circumferentially spaced, pole tooth forming portions extend in a generally radial direction, said plurality of laminated plates being in abutting relation with their pole tooth forming portions aligned to form a plurality of cores, a plurality of phase windings, each of said plurality of phase windings being wound around a series of said cores arranged in groups of adjacent cores, said groups of cores being spaced by cores around which other of said phase windings are wound, the windings of each group of each of said phases being connected to each other by crossover wires to provide the electrical connection between the coils of said groups of adjacent cores, an axial outermost of said laminated plates being formed with outstanding tabs at circumferentially spaced locations against which said crossover wires lie, the number 3m of pole teeth being 3×3×s, a multiple of nine, and coils of the same phase are wound on adjacent m/3s pole teeth at positions of the circumference divided into equal parts of 3s in series, and wound in the opposite direction to each other corresponding to polarity change of associated magnets which said pole tooth face.

13. A coil winding arrangement as set forth in claim 12, wherein the crossover wires are adhesively bonded to the outstanding tabs.

14. A coil winding arrangement as set forth in claim 13, wherein the adhesive bond is formed by an insulating material.

15. A coil winding arrangement as set forth in claim 14, wherein the insulating material is applied to the laminated plates before the winding and to the coils and crossover wires after winding.

* * * * *